Patented Oct. 21, 1941

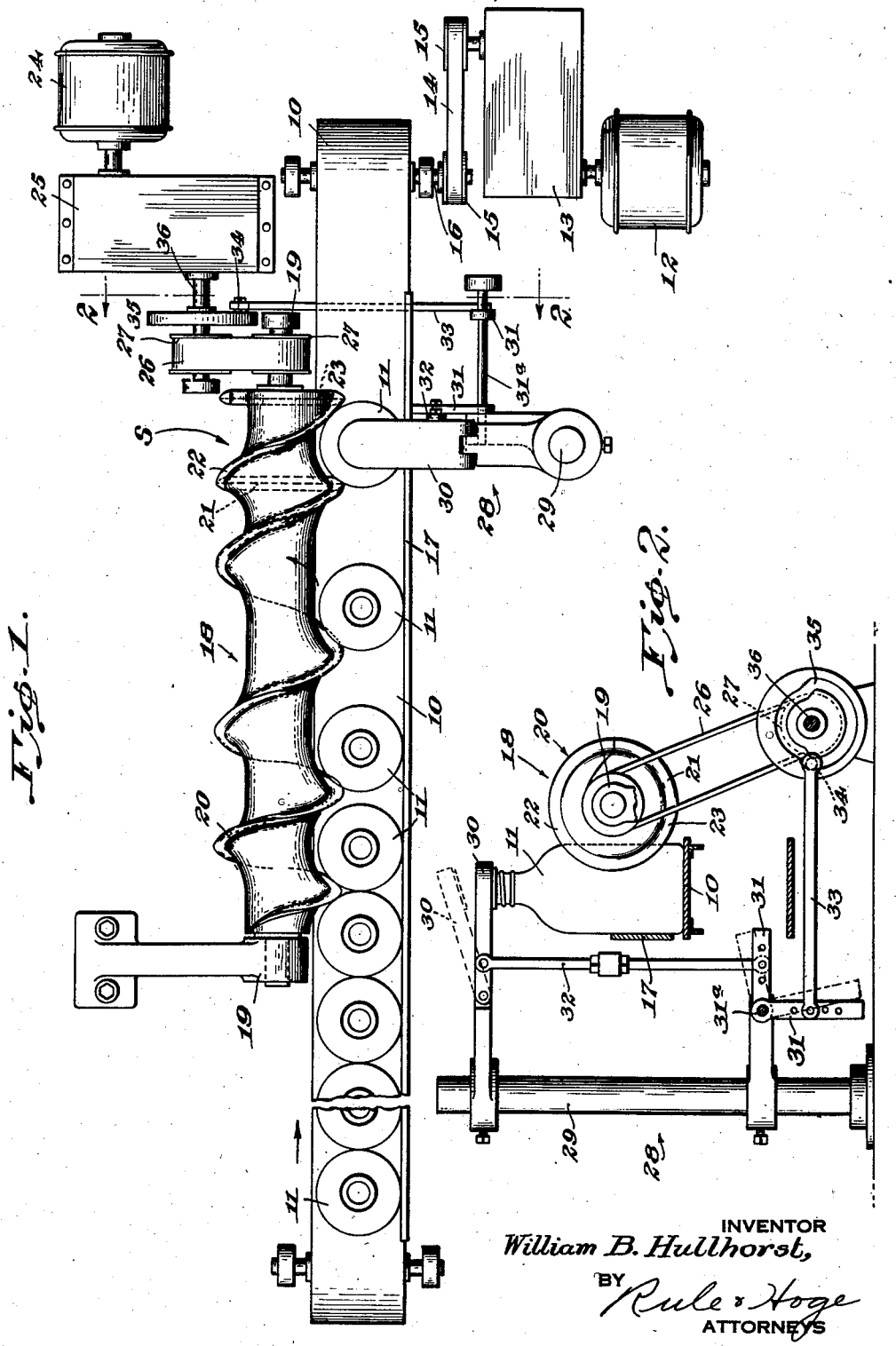

2,259,748

UNITED STATES PATENT OFFICE 2,259,748

CONVEYER

William B. Hullhorst, Toledo, Ohio, assignor to Owens-Illinois Glass Company, a corporation of Ohio Application March 29, 1940, Serial No. 326,696

4 Claims. (Cl. 198—34)

The present invention relates to improvements in conveyers and more particularly is concerned with the provision of novel and effective means for momentarily retarding advancing movement of the articles one at a time, upon a continuously moving conveyer, to permit labeling or any other desired operation upon the articles.

An object of my invention is the provision of a conveying system including a continuously rotating timing screw which is so formed, that, in conjunction with a continuously moving horizontal conveyer, it will operate to gradually increase the spaced relation between articles that are being delivered to a preselected station by the conveyer and momentarily hold the articles stationary at the station one at a time, without regard to the continued movement of the conveyer and other articles, whereby to facilitate the performance of any desired operation upon the articles. To this end the timing screw is so formed that the thread, substantially medially of its length, accelerates forward movement of the articles one at a time and at the exit end of the screw is so formed that the normal forward motion of each article is completely stopped until it has been labeled or otherwise treated.

Another object of my invention is the provision of a timing screw which is usable with any of the various types of conveyers and is of such construction that several may be arranged in end to end relation alongside of a conveyer and employed in delivering articles in the desired spaced relation to a series of stations at which various operations may be performed thereon.

Other objects will be in part apparent and in part pointed out hereinafter.

In the drawing:

Fig. 1 is a top plan view of a conveyer system including the timing screw which embodies my invention.

Fig. 2 is a sectional elevational view taken substantially along the line 2—2 of Fig. 1.

While the invention is capable of use with various types of conveyers and for the purpose of handling a great variety of articles, I have in the accompanying drawing illustrated it in conjunction with a horizontal endless belt type conveyer which is transporting glass containers to a sealing station.

The endless conveyer 10 is disposed horizontally and operates to bring glass bottles 11 to a capping or sealing station S. This conveyer may be driven by conventional means including an electric motor 12 operating through a speed reducing unit 13 and a belt 14 which connects a pair of pulleys 15, one of the latter being mounted upon a shaft 16 at one end of the conveyer.

The bottles 11 are retained against excessive lateral shifting upon the conveyer 10 by means of a longitudinal guide 17 which is positioned alongside of the conveyer opposite a timing screw 18, the latter being disposed in parallel relationship to said conveyer.

This timing screw functions to space the bottles apart sufficiently in advance of arrival at the sealing or capping station S to permit complete cessation of forward movement of the bottles at said station for the period of time required to apply and firmly attach closures or caps thereto. The screw 18 is journaled in bearings 19 and at least in part overlies a marginal portion of the conveyer so that the thread 20 may engage the side surfaces of the bottles as they are carried to the capping station S by said conveyer. At the inlet or entrance end of the timing screw, the pitch or lead of the thread is such that together with rotation of the screw at a predetermined speed, it does not have any accelerating or decelerating effect upon the speed of travel of the bottles. Substantially medially of the length of the timing screw the thread thereof is increased in pitch or lead sufficiently to accelerate the speed of movement of the bottles one at a time and advance them relative to the following bottles and conveyer a distance substantially equal to the diameter of one of the bottles. By so spacing the bottles prior to arrival thereof at the capping station, it is practicable to hold them stationary at said station during the capping operation without in any way interrupting normal forward travel of the other bottles with the conveyer 10.

The bottles are held stationary at the capping station due to the specific contour of the thread of the timing screw in proximity to the exit end of the latter. The specific construction includes a semi-circular radial flange 21 disposed in a plane at right angles to the axis of said screw, said flange being in effect a continuation of the main thread 20 and connecting the latter with a relatively short spiral thread 22, the latter at its other end merging into an end of a radial flange 23 which is formed at the extreme end of the timing screw and extends in a direction circumferentially of the latter for a distance of approximately 90°. This end flange 23 positively holds the bottles one at a time against forward movement with the conveyer 10. The other flange 21 prevents contact between a container that is being held stationary and the next succeeding container such as might otherwise occur under some conditions. As the screw rotates and the outer end of the radial flange 23 moves out of contact with a bottle, the latter is engaged by the spiral thread portion 22, the lead or pitch of which is such that it functions as a cam and causes the bottle to resume its forward movement, the initial portion of which movement is slightly faster than the speed of the conveyer 10. Thus contact between the containers is prevented.

Mechanism for imparting continuous rotation to the timing screw may well include an electric motor 24 operating through a speed reduction unit 25 and a belt 26 or the like which is trained over a pair of pulleys 27. One of these pulleys is mounted directly upon an end of the timing screw 18.

For the purpose of illustration I have shown a capping or sealing unit 28 positioned at the capping station S. This unit obtains its power from the motor 24. The construction may include a standard 29 which pivotally supports a capping head 30. This head is brought into engagement with the bottles at regular intervals by mechanism including a pair of bell crank levers 31 and a shaft 31ª supporting them. One lever is connected through a rod 32 to said head while the other is secured to a push rod 33. This latter rod carries a cam roll 34 which runs in a closed rotary cam 35, the latter being mounted upon a shaft 36 which is driven by the motor 24 through the aforementioned speed reduction unit 25.

In view of the above it will be apparent that in operation the mechanism continuously delivers bottles to the capping unit and just prior to arrival of the bottles at said station, spaces them apart sufficiently to permit complete cessation of the forward movement thereof during the capping operation.

Modifications may be resorted to within the spirit and scope of the appended claims.

I claim:

1. In a conveyer system of the character described, a horizontal continuously moving conveyer, a guide arranged along one side thereof, and a timing screw positioned at the opposite side of the conveyer and in part overlying the latter, the thread of the screw being in part shaped to accelerate forward movement of articles on and relative to the conveyer and thereafter momentarily completely stop such forward movement and finally release the article for normal travel with said conveyer.

2. In a conveyer system of the character described, a horizontal continuously moving conveyer, a guide arranged along one side thereof, a timing screw positioned at the opposite side of the conveyer and in part overlying the latter, said timing screw having a continuous thread from its inlet end to a point in proximity to the exit end thereof, a major portion of the thread remote from the inlet end being of greater pitch than the remainder and a pair of longitudinally spaced radial flanges forming a part of the exit end of the screw and extending in a direction circumferentially of the latter, said flanges being connected to and forming a continuation of the thread proper, means for imparting continuous rotation to the timing screw, and a segmental spiral thread connecting the opposed ends of said flanges.

3. A conveyer system including a horizontal conveyer adapted to carry articles to and away from a preselected station, a timing screw in part overlying said conveyer and disposed parallel thereto, a guide spaced from the timing screw and extending lengthwise of the conveyer, the thread at the inlet end of said screw being shaped to engage the articles without accelerating or decelerating their speed, the adjacent part of the screw thread being shaped to accelerate movement of the articles relative to the conveyer as they approach said station, means at said station connected to and forming an extension of the screw thread for effecting momentary cessation of the advancing movement of the articles, means for continuously rotating the timing screw and means for moving the conveyer at a constant speed.

4. In apparatus of the character described, a timing screw arranged alongside of a continuously moving horizontal conveyer and in part overlying the latter, said screw having inlet and exit ends, the lead of the screw thread intermediate the length of the latter being increased in pitch, said thread at the inlet end having pitch to effect movement of the articles at the same speed as that of the conveyer, said thread in proximity to the exit of the screw being formed to momentarily retard advancing movement of articles engaged thereby, and means for imparting continuous rotary movement to the timing screw.

WILLIAM B. HULLHORST.